United States Patent
Eijkenboom et al.

(10) Patent No.: US 6,793,119 B2
(45) Date of Patent: Sep. 21, 2004

(54) PROCESS FOR WELDING DUPLEX STEEL

(75) Inventors: Joseph Maria Gerardus Eijkenboom, Sittard (NL); Jozef Hubert Meessen, Gulpen (NL); Hendrikus Catharina Guillaume Maria Schrijen, Hoensbroek (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/228,259

(22) Filed: Aug. 27, 2002

(65) Prior Publication Data

US 2003/0066868 A1 Apr. 10, 2003

Related U.S. Application Data

(63) Continuation of application No. PCT/NL01/00117, filed on Feb. 12, 2001.

(30) Foreign Application Priority Data

Feb. 28, 2000 (NL) .............................. 1014512

(51) Int. Cl.$^7$ .......................... B23K 31/02; B23K 35/38
(52) U.S. Cl. ...................... 228/119; 228/164; 228/219; 228/262.41
(58) Field of Search .............................. 228/219, 262.1, 228/119, 164, 170, 262.41; 219/121.63, 121.64

(56) References Cited

U.S. PATENT DOCUMENTS

| | | | |
|---|---|---|---|
| 3,066,215 A | | 11/1962 | Espy |
| 4,119,765 A | * | 10/1978 | Pinnow et al. |
| 4,331,474 A | * | 5/1982 | Espy |
| 4,340,432 A | * | 7/1982 | Hede ........................... 419/42 |
| 4,585,479 A | * | 4/1986 | Aoki et al. .................... 420/43 |
| 4,659,397 A | * | 4/1987 | Kobayashi et al. .......... 148/506 |
| 4,832,765 A | * | 5/1989 | DeBold et al. .............. 148/325 |
| 4,987,367 A | * | 1/1991 | Ishikawa et al. ............. 324/227 |
| 5,582,656 A | * | 12/1996 | Kangas et al. ............... 148/325 |
| 5,739,503 A | * | 4/1998 | Rouault et al. ...... 219/137 WM |
| 5,830,408 A | * | 11/1998 | Azuma et al. ................. 420/43 |
| 5,942,184 A | * | 8/1999 | Azuma et al. ................. 420/67 |
| 6,173,495 B1 | * | 1/2001 | Erike |
| 6,204,477 B1 | * | 3/2001 | Lai ..................... 219/137 WM |
| 6,312,532 B1 | * | 11/2001 | Kangas ........................ 148/325 |
| 6,451,133 B1 | * | 9/2002 | Frodigh et al. .............. 148/325 |
| 2001/0052511 A1 | * | 12/2001 | Briand et al. |

FOREIGN PATENT DOCUMENTS

| | | |
|---|---|---|
| DE | 196 45 746 | 5/1998 |
| EP | 0089943 A1 * | 9/1983 |
| EP | 163379 | 12/1985 |
| EP | 0680802 A1 * | 11/1995 |
| GB | 2166159 A * | 4/1986 |
| JP | 50075511 A * | 6/1975 |
| JP | 2001113388 A * | 4/2001 |
| KR | 2001057596 A * | 7/2001 |
| KR | 2002052623 A * | 7/2002 |
| WO | 95 00674 | 1/1995 |
| WO | 734810 | 10/1996 |
| WO | WO 01/64386 A1 * | 9/2001 |

OTHER PUBLICATIONS

Wiktorowicz et al., "Shielding Gas Developments for TIG Welding of Duplex and Super Duplex Stainless Steels", Welding and Metal Fabrication, Vo. 62, No. 9, Oct. 1, 1994, pp. 379–382.

Urmston et al., "Development of Shielding Gases for Stainless Steel Welding", Welding and Metal Fabrication, vol. 62, No. 4, Apr. 1, 1994, pp. 165, 168.

* cited by examiner

Primary Examiner—Kiley Stoner
(74) Attorney, Agent, or Firm—Mayer, Brown, Rowe & Maw LLP

(57) ABSTRACT

Process for welding duplex steel in the presence of a shielding gas without use being made of welding aids and with nitrogen being added to the shielding gas and with an austenitic-ferritic duplex steel with a chromium content of between 28 and 35 wt. % and a nickel content of between 3 and 10 wt. % being used.

13 Claims, No Drawings

PROCESS FOR WELDING DUPLEX STEEL

CROSS REFERENCE TO RELATED APPLICATIONS

This application is a continuation of International Application No. PCT/NL01/00117, filed Feb. 12, 2001, which claims priority from Dutch Serial No. 1014512, filed Feb. 28, 2000. These applications, in their entirety, are incorporated herein by reference.

BACKGROUND OF THE INVENTION

The invention relates to a process for welding duplex steel in the presence of a shielding gas.

Duplex steel is a stainless steel with a ferritic-austenitic structure with the two phases having different compositions. The duplex structure means that chromium and molybdenum are predominantly present in the ferrite phase and nickel and nitrogen in the austenite phase.

Duplex steel is often used in corrosive environments on account of its corrosion resistance. Duplex steel is successfully used especially in urea plants, where it comes into contact with the corrosive ammonium carbamate solutions and particularly in the high-pressure section of urea plants. Here, the most critical items such as high-pressure vessels, seals around manholes, piping, flanges and valves are manufactured from duplex steel.

The use of duplex steel in a plant requires that duplex steel components be able to be attached to each other. The welding of duplex steel is a process known to those skilled in the art for joining duplex metal parts. Duplex metal parts are welded together in the presence of a gas, a so-called shielding gas, that provides an inert atmosphere. Generally, those skilled in the art will use gases such as argon and helium as a shielding gas. These shielding gases prevent oxidation during weld fabrication.

The drawback of duplex steel welding is that duplex steel parts cannot be welded together without using a welding aid that takes care of the welded joint if the specific properties of the steel are to be retained. Specific properties of the steel include mechanical properties, such as tensile strength, ductility and corrosion resistance. Particularly with welding techniques such as IBW (Internal Bore Welding), laser beam welding or electron beam welding, duplex steel cannot be used without impairing its specific properties, because these welding techniques do not allow the use of welding aids. These welding techniques are for example needed for fabricating crevice-free tube-to-tubesheet joints. Those skilled in the art will normally use welding aids such as coated welding electrodes and solid or filled filler metal.

The aim of the present invention is to eliminate the above-mentioned drawbacks and to enable the welding of duplex steel without welding aids, without the specific properties of the duplex steel being impaired.

The applicant has found a process for welding duplex steel in the presence of a shielding gas without use being made of welding aids and with nitrogen being added to the shielding gas. In particular, a process was found for welding duplex steel in the presence of a shielding gas without using welding aids and with nitrogen being added to the shielding gas and with an austenitic-ferritic duplex steel being used with a chromium content of between 28 and 35 wt. % and a nickel content of between 3 and 10 wt. %.

Preferably an austenitic-ferritic duplex steel with the following composition is used:

C: maximum 0.05 wt. %
Si: maximum 0.8 wt. %
Mn: 0.3–4.0 wt. %
Cr: 28–35 wt. %
Ni: 3–10 wt. %
Mo: 1.0–4.0 wt. %
N: 0.2–0.6 wt. %
Cu: maximum 1.0 wt. %
W: maximum 2.0 wt. %
S: maximum 0.01 wt. %
Ce: maximum 0.2 wt. % the balance consisting of Fe and common impurities and additives and the ferrite content ranging from 30 to 70 vol. %.

More preferably the C content is maximum 0.03 wt. % and in particular maximum 0.02 wt. %, the Si content is maximum 0.5 wt. %, the Cr content 29–33 wt. %, the Ni content 3–7 wt. %, the Mo content 1–3 wt. %, in particular 1–2 wt. %, the N content 0.36–0.55 wt. % and the Mn content 0.3–1 wt. %.

The ferrite content is more preferably 30–55 vol. %. The Cr content of the austenite phase is more preferably at least 25 wt. % and in particular at least 27 wt. %.

Preferably 1–10 vol. % nitrogen is added to the shielding gas, in particular 1–5 vol. % and more in particular 1–3 vol. %.

The advantage of the process according to the present invention is that it allows duplex steel to be IBW-welded, laser beam welded and electron beam welded while retaining the specific properties.

A widely used embodiment of the welding together of ferritic-austenitic steel comprises attaching the steel components to each other via a so-called overlay weld. Here, a contact surface is fabricated by applying a layer of the ferritic-austenitic duplex steel to a base, generally a cheaper carbon steel, using a known welding process. Another object of duplex steel or with a duplex steel contact surface can be attached to the said overlay weld using the welding process according to the present invention. However, objects thus welded often break off as a result of hairline cracks developing in the duplex steel of the overlay weld.

It has now been found that this drawback can be eliminated by a process enabling two or more duplex steel parts to be joined via an overlay weld. In the process, the contact surfaces of the metal parts are partly or completely fabricated from ferritic-austenitic steel with a chromium content of between 28 and 35 wt. % and a nickel content of from 3 to 10 wt. %, after which the topmost 0.1–1.0 mm, preferably 0.2–0.8 mm and in particular 0.3–0.7 mm, of the contact surfaces is removed, after which the metal parts are welded together. The said top layer can be removed by any process known to those skilled in the art, such as grinding, filing, using abrasives, etc.

The welding and overlay welding processes according to the invention are particularly useful in the manufacture of piping components such as flanges and valves inasmuch as such piping components will be less susceptible to crevice corrosion. Such components are fabricated from a duplex ferritic-austenitic steel with a chromium content of between 28 and 35 wt. % and a nickel content of between 3 and 10 wt. % and are attached to each other by means of a welding process or overlay welding process without using welding aids and with 1–10 vol % nitrogen being added to the shielding gas.

Especially welded joints in areas where flanges and valves are present in a high-pressure section of a urea plant can be advantageously fabricated according to the present invention.

Accordingly, the invention relates in particular to application of the welding process and overlay welding process in a urea plant.

The aforementioned piping components are sources of leakage. Where materials susceptible to crevice corrosion are utilized, corrosion will in the course of time develop in the cervices, which are inherent in the said piping components, which results in leakage of process fluid. This occurs especially in for example the high-pressure section of a urea plant. The plant will then need to be shut down because of safety and environmental regulations. If such piping components are fabricated using the process of the present invention, they will be much less susceptible to crevice corrosion and leaks will be prevented.

Where the aforementioned duplex steel is utilized, the reduced susceptibility to corrosion allows more pumps to be used in place of gravitation for conveying process streams. This obviates the need to position items of equipment one above the other, such as the high-pressure carbamate condenser and the reactor in a urea plant. All equipment items can be placed on the ground so that considerable investment savings can be achieved.

It is important that the duplex steel used in the present invention have a good ferrite-austenite distribution. If the distribution is not optimal, then the properties of the steel will decrease. This may lead to fracture of piping and equipment and the steel will also be more susceptible to corrosion. It has been found that the homogeneity of the ferritic-austenitic steel can be readily tested by conducting measurements with an eddy current coil. When a piece of metal is passed through such a coil, the places where the distribution is insufficient are directly revealed. The alternative for such eddy current coil measurement is a destructive process.

Urea can be prepared by introducing (excess) ammonia and carbon dioxide into a synthesis zone at a suitable pressure (for example 12–40 MPa) and a suitable temperature (for example 160–250° C.), which first results in the formation of ammonium carbamate according to the reaction:

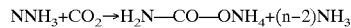
$$NNH_3 + CO_2 \rightarrow H_2N-CO-ONH_4 + (n-2)NH_3$$

Dehydration of the ammonium carbamate formed then results in the formation of urea according to the equilibrium reaction:

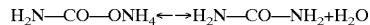
$$H_2N-CO-ONH_4 \leftrightarrow H_2N-CO-NH_2 + H_2O$$

The theoretically attainable conversion of ammonia and carbon dioxide into urea is determined by the thermodynamic position of the equilibrium and depends on for example the $NH_3/CO_2$ ratio (N/C ratio), the $H_2O/CO_2$ ratio and temperature, and can be calculated with the aid of the models described in for example Bull. of the Chem. Soc. of Japan 1972,Vol. 45,pages 1339–1345 and J. Applied Chem of the USSR (1981), Vol. 54,pages 1898–1901.

In the conversion of ammonia and carbon dioxide to urea there evolves as a reaction product a urea synthesis solution which consists essentially of urea, water, ammonium carbamate and unbound ammonia.

Besides the urea synthesis solution, there may evolve in the synthesis zone a gas mixture of unconverted ammonia and carbon dioxide along with inert gases. Ammonia and carbon dioxide are removed from this gas mixture and are preferably returned to the synthesis zone.

In practice, various processes are used for the preparation of urea. Initially, urea was prepared in so-called conventional high-pressure urea plants, which at the end of the 1960s were succeeded by processes carried out in so-called urea stripping plants.

A conventional high-pressure urea plant is understood to be a urea plant in which the ammonium carbamate that has not been converted into urea is decomposed, and the customary excess ammonia is expelled, at a substantially lower pressure than the pressure in the synthesis reactor itself. In a conventional high-pressure urea plant the synthesis reactor is usually operated at a temperature of 180–250° C. and a pressure of 15–40 MPa. In a conventional high-pressure urea plant, following expansion, dissociation and condensation at a pressure of between 1.5 and 10 MPa, the reactants that are not converted into urea are returned to the urea synthesis as a carbamate stream. In addition, in a conventional high-pressure urea plant, ammonia and carbon dioxide are fed directly to the urea reactor. The N/C ratio in the urea synthesis in a conventional high-pressure urea process is between 3 and 5 and $CO_2$ conversion between 64 and 68%.

Initially, such conventional urea plants were designed as so-called 'Once-Through' processes. Here, non-converted ammonia was neutralized with acid (for example nitric acid) and converted into ammonia salts (for example ammonium nitrate). It did not take long until these conventional Once-Through urea processes were replaced with Conventional Recycle Processes, in which all non-converted ammonia and carbon dioxide are recycled to the urea reactor as carbamate streams. In the recovery section, non-converted ammonia and carbon dioxide are removed from the urea synthesis solution obtained in the synthesis reactor, in which process a urea in water solution evolves. Next, this urea in water solution is converted into urea in the evaporation section by evaporating water at reduced pressure.

A urea stripping plant is understood to be a urea plant in which the ammonium carbamate that has not been converted into urea is largely decomposed, and the customary excess ammonia is largely expelled, at a pressure that is essentially almost equal to the pressure in the synthesis reactor. This decomposition/expulsion takes place in a stripper with or without addition of a stripping agent. In a stripping process, carbon dioxide and/or ammonia may be used as stripping gas before these components are added to the reactor. Such stripping is effected in a stripper installed downstream of the synthesis reactor; in it, the urea synthesis solution coming from the urea reactor, which contains urea, ammonium carbamate and water as well as ammonia, is stripped with the stripping gas with addition of heat. It is also possible to use thermal stripping here. Thermal stripping means that ammonium carbamate is decomposed and the ammonia and carbon dioxide present are removed from the urea solution exclusively by means of the supply of heat. Stripping may also be effected in two or more steps. In a known process a first, purely thermal stripping step is followed by a CO2 stripping step with addition of heat. The gas stream containing ammonia and carbon dioxide exiting from the stripper is returned to the reactor whether or not via a high-pressure carbamate condenser.

In a urea stripping plant the synthesis reactor is operated at a temperature of 160–240° C. and preferably at a temperature of 170–220° C. The pressure in the synthesis reactor is 12–21 MPa, preferably 12.5–19.5 MPa. The N/C ratio in the synthesis in a stripping plant is between 2.5 and 4 and $CO_2$ conversion between 58 and 65%. The synthesis may be carried out in one or two reactors. When use is made of two reactors, the first reactor, for example, may be operated using virtually fresh raw materials and the second using raw materials entirely or partly recycled, for example from the urea recovery.

A frequently used embodiment for the preparation of urea by a stripping process is the Stamicarbon $CO_2$ stripping process as described in European Chemical News, Urea Supplement, of Jan. 17, 1969, pages 17–20. The greater part of the gas mixture obtained in the stripping operation is condensed and adsorbed in a high-pressure carbamate condenser, after which the ammonium carbamate stream formed is returned to the synthesis zone for the formation of urea.

The high-pressure carbamate condenser may de designed as, for example, a so-called submerged condenser as described in NL-A-8400839. The submerged condenser can be placed in horizontal or vertical position. It is, however, particularly advantageous to carry out the condensation in a horizontal submerged condenser (a so-called pool condenser; see for example Nitrogen No 222, July–August 1996, pp. 29–31).

After the stripping operation, the pressure of the stripped urea synthesis solution is reduced to a low level in the urea recovery and the solution is evaporated, after which urea is released and a low-pressure carbamate stream is circulated to the synthesis section.

In both conventional urea processes and urea stripping processes an oxidizing agent is added to the plant in order to protect the materials of construction against corrosion. An oxide skin is formed on the metal parts, which protects against corrosion. This process is known as passivation. The passivating agent may be oxygen or an oxygen-releasing compound as described in for example U.S. Pat. No. 2,727,069. Normally, oxygen is used in the form of air. The passivating agent is added for example to one of the raw materials.

Although this addition of oxygen/air protects the materials of construction against corrosion, it has a number of drawbacks:

the oxygen/air must be removed from the process without ammonia and carbon dioxide leaving the process. This requires expensive and energy-consuming scrubbing systems for these gas streams;

the raw materials for urea production (ammonia and carbon dioxide) as produced in a modem ammonia plant always contain traces of hydrogen. These traces, together with the passivating air supplied, may lead to the formation of explosive hydrogen/air mixtures in some plant sections. To prevent this or to protect against this, expensive provisions are necessary.

It is known that such oxygen/air addition can be considerably reduced, or can be omitted, by using duplex steel, so that the drawbacks occur to a lesser extent, if at all, while yet attaining a high degree of reliability. WO-95/00674 teaches the application of a duplex steel grade in urea plants and refers to the omission of passivating gas.

Furthermore, this process is very suitable for improving and optimizing existing urea plants by replacing piping and equipment items in areas where corrosion occurs with piping and equipment items fabricated using the welding process and overlay welding process according to the present invention. The process is particularly suitable for revamping existing urea plants by using the jointing process of the present invention in areas where hairline cracks are formed in duplex steel overlay welds.

The invention may be applied in all current urea processes, both conventional urea processes and urea stripping processes. Examples of conventional urea processes in which the invention may be applied are the so-called 'Once-Through', Conventional 'Recycling' and Heat Recycling Processes. Examples of urea stripping processes in which the invention may be applied are the $CO_2$ stripping process, the $NH_3$ stripping process, the self-stripping process, the ACES (Advanced Process for Cost and Energy Saving) process, the IDR (Isobaric-Double-Recycle) process and the HEC process.

The invention is illustrated by the following examples.

EXAMPLE I

In the pool condenser (a shell-and-tube heat exchanger) of a urea plant based on the CO2 stripping process, the high-pressure carbamate from the high-pressure scrubber is passed through the shell side of the heat exchanger and the cooling steam condensate flows through the tubes of the heat exchanger. This presents on the shell side the advantage of extra residence time, resulting in the formation of urea, which yields a higher condensation temperature and, thus, better heat transfer. It is advantageous to fabricate the tubes and the tube-to-tubesheet joints from duplex steel, since in that case less (or no) oxygen needs to be added to the process. The duplex tube-to-tubesheet joints must, however, be free of crevices. Such a tube-to-tubesheet joint is made using IBW techniques according to the process of the present invention with 2 vol. % nitrogen being added to the shielding gas, for example argon. This IBW technique operates without welding aids.

EXAMPLE II

In the stripper located downstream of the reactor in the CO2 stripping process, the urea synthesis solution coming from the reactor is stripped with carbon dioxide, with addition of heat, and with ammonium carbamate being decomposed and the gases being removed. The top compartment (stripper head) of this stripper contains what is known as internals consisting of relatively thin (5–10 mm) sheet steel, which need to be attached to the wall of the stripper column. It is advantageous to fabricate this stripper head from carbon steel provided with a duplex overlay weld preventing corrosion of the carbon steel. Only through the overlay welding process of the present invention is it possible to attach the internals to this overlay weld by means of a welding process.

EXAMPLE III

Practice indicates that, according to current experience, a urea plant can be kept up and running for about half a year on average. This means that a urea plant must be shut down every half year because of leaks in piping components in the high-pressure section caused by crevice corrosion. This shut-down frequency is reduced to a minimum by consistently fabricating such piping components from duplex steel applied via the process of the invention. Production runs lasting several years are then possible, which presents a considerable economic advantage through reduced production outage.

What is claimed is:

1. Process which comprises welding duplex steel in the presence of a shielding gas, wherein no use is made of welding aids and further wherein nitrogen is added to the shielding gas.

2. Process according to claim 1, wherein an austenitic-ferritic duplex steel with a chromium content of between 28 and 35 wt. % and a nickel content of between 3 and 10 wt. % is used.

3. Process according to claim 1, wherein austenitic-ferritic duplex steel with the following composition is used:

C: maximum 0.05 wt. %
Si: maximum 0.8 wt. %
Mn: 0.3–4.0 wt. %
Cr: 28–35wt. %
Ni: 3–10wt. %
Mo: 1.0–4.0wt. %
N: 0.2–0.6wt. %
Cu: maximum 1.0 wt. %
W: maximum 2.0 wt. %
S: maximum 0.01 wt. %
Ce: maximum 0.2 wt. %
the balance consisting of Fe and common impurities and additives and the ferrite content ranging from 30 to 70 vol %.

4. Process according to claim 1, wherein austenitic-ferritic duplex steel with a Cr content of 29–33 wt. % is used.

5. Process according to claim 1, wherein austenitic-ferritic duplex steel with Ni content of 3–7 wt. % is used.

6. Process according to claim 1, wherein austenitic-ferritic duplex steel with a Cr content in the austenite phase of at least 25 wt. % is used.

7. Process according to claim 1, which comprises adding 1–10 vol. % nitrogen to the shielding gas.

8. Process for joining two or more metal parts via a weld, wherein the contact surfaces of the metal parts are partly or completely fabricated from ferritic-austenitic steel with a chromium content of between 28 and 35 wt. % and a nickel content of from 3 to 10 wt. %, which comprises removing the topmost 0.1–1.0 mm from the metal parts and thereafter welding the metal parts to each other.

9. Process for fabricating piping components fabricated from a duplex ferritic-austenitic steel with a chromium content of between 28 and 35 wt. % and a nickel content of between 3 and 10 wt. % which comprises welding said piping components to each other without using welding aids and in the presence of a shielding gas to which 1–10 vol. % nitrogen is added.

10. Process for improving and optimizing existing urea plants by replacing piping and equipment items in areas where corrosion occurs with piping and equipment items fabricated using the welding process according to claim 1.

11. Process for revamping existing urea plants by using the joining process according to claim 8 in areas where hairline cracks are formed in duplex steel overlay welds.

12. Process for improving and optimizing existing urea plants by replacing piping and equipment items in areas where corrosion occurs with piping and equipment items fabricated using the welding process according to claim 8.

13. Process for improving and optimizing existing urea plants by replacing piping and equipment items in areas where corrosion occurs with piping and equipment items fabricated using the welding process according to claim 9.

* * * * *